US010560797B2

(12) United States Patent
Ikemoto et al.

(10) Patent No.: US 10,560,797 B2
(45) Date of Patent: Feb. 11, 2020

(54) INFORMATION PROCESSING DEVICE AND METHOD

(71) Applicant: HITACHI, LTD., Tokyo (JP)

(72) Inventors: Yu Ikemoto, Tokyo (JP); Tohru Watanabe, Tokyo (JP); Masato Utsumi, Tokyo (JP); Yoshihisa Okamoto, Tokyo (JP); Kengo Ogawa, Tokyo (JP); Yuko Yonekura, Tokyo (JP); Haruyuki Takano, Tokyo (JP); Hironobu Bandoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/762,296

(22) PCT Filed: Apr. 27, 2016

(86) PCT No.: PCT/JP2016/063305
§ 371 (c)(1),
(2) Date: Mar. 22, 2018

(87) PCT Pub. No.: WO2017/187584
PCT Pub. Date: Nov. 2, 2017

(65) Prior Publication Data
US 2018/0302741 A1    Oct. 18, 2018

(51) Int. Cl.
*H04W 4/029* (2018.01)
*H04W 4/02* (2018.01)
(Continued)

(52) U.S. Cl.
CPC ............ *H04W 4/02* (2013.01); *G06F 13/00* (2013.01); *G06F 16/2228* (2019.01);
(Continued)

(58) Field of Classification Search
CPC ......... H04W 4/02; H04W 8/16; H04W 4/029; H04W 12/00502; G06F 17/30321; G06F 17/30241; H04F 9/44505
See application file for complete search history.

(56) References Cited

U.S. PATENT DOCUMENTS

2002/0102996 A1    8/2002    Jenkins
2006/0128401 A1    6/2006    Hayashi et al.
(Continued)

FOREIGN PATENT DOCUMENTS

JP    2002-199423 A    7/2002
JP    2005-148289 A    6/2005
(Continued)

OTHER PUBLICATIONS

International Search Report of PCT/JP2016/063305 dated Jul. 19, 2016.
(Continued)

*Primary Examiner* — Charles N Appiah
*Assistant Examiner* — Xiang Zhang
(74) *Attorney, Agent, or Firm* — Mattingly & Malur, PC

(57) ABSTRACT

To propose an information processing device and method capable of planning an effective scheme, such as distributing information appropriate to a user. Time-series positional data composed of time-series positional information of a mobile communication body are collected, and a regular behavior of a user of the mobile communication body is estimated on the basis of the collected time-series positional data of the mobile communication body.

10 Claims, 15 Drawing Sheets

USER POSITIONAL INFORMATION TABLE — 22

| USER ID | ITEM | | VALUE | | |
|---|---|---|---|---|---|
| USER ID = 1 | TIME STAMP | | {2015-01-01 09:00, 2015-01-01 09:05, ...} | 22D | |
| | POSITIONAL INFORMATION | LATITUDE | {35.451414, 35.451416, ...} | 22F | 22E |
| | | LONGITUDE | {139.632177, 139.635137, ...} | 22G | |
| | | POSITION MEASUREMENT ERROR | {10.0m, 10.0m, ...} | 22H | |
| USER ID = 2 | TIME STAMP | | {2015-01-01 09:00, 2015-01-01 09:05, ...} | 22D | |
| | POSITIONAL INFORMATION | LATITUDE | {36.451414, 36.451416, ...} | 22F | 22E |
| | | LONGITUDE | {138.632177, 138.635137, ...} | 22G | |
| | | POSITION MEASUREMENT ERROR | {50.0m, 40.0m, ...} | 22H | |
| ... | ... | ... | ... | | |

22A    22B    22C

(51) Int. Cl.
  *G06F 16/29* (2019.01)
  *G06F 16/22* (2019.01)
  *G06F 13/00* (2006.01)
  *G06Q 30/02* (2012.01)
  *H04W 4/021* (2018.01)

(52) U.S. Cl.
  CPC ............ *G06F 16/29* (2019.01); *G06Q 30/02* (2013.01); *H04W 4/021* (2013.01)

(56) References Cited

U.S. PATENT DOCUMENTS

| | | | | |
|---|---|---|---|---|
| 2009/0054043 | A1* | 2/2009 | Hamilton | G01S 5/0284 455/414.2 |
| 2010/0082397 | A1* | 4/2010 | Blegen | G06Q 30/02 705/14.58 |
| 2010/0159871 | A1 | 6/2010 | Tester | |
| 2014/0099978 | A1* | 4/2014 | Egner | H04W 28/26 455/456.6 |
| 2015/0334077 | A1* | 11/2015 | Feldman | H04L 51/32 715/744 |

FOREIGN PATENT DOCUMENTS

| | | |
|---|---|---|
| JP | 2006-163996 A | 6/2006 |
| JP | 2008-181184 A | 8/2008 |
| JP | 2011-100182 A | 5/2011 |
| JP | 2011-154004 A | 8/2011 |
| JP | 2015-049681 A | 3/2015 |
| JP | 2015-114755 A | 6/2015 |

OTHER PUBLICATIONS

Japanese Office Action received in corresponding Japanese Application No. 2018-514042 dated Apr. 16, 2019.
Extended European Search Report received in corresponding European Application No. 16900454.6 dated Aug. 5, 2019.

* cited by examiner

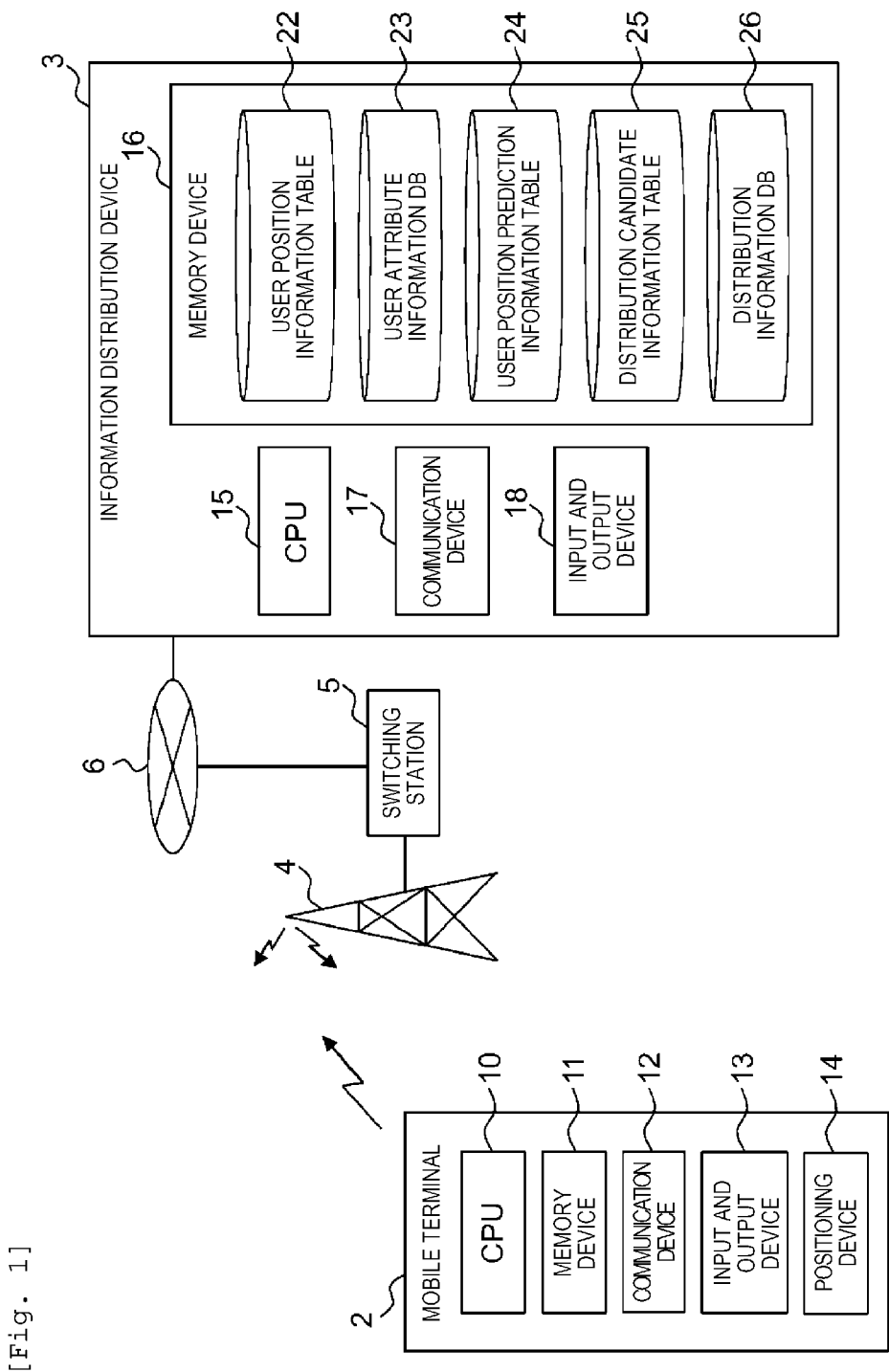
[Fig. 1]

[Fig. 2]
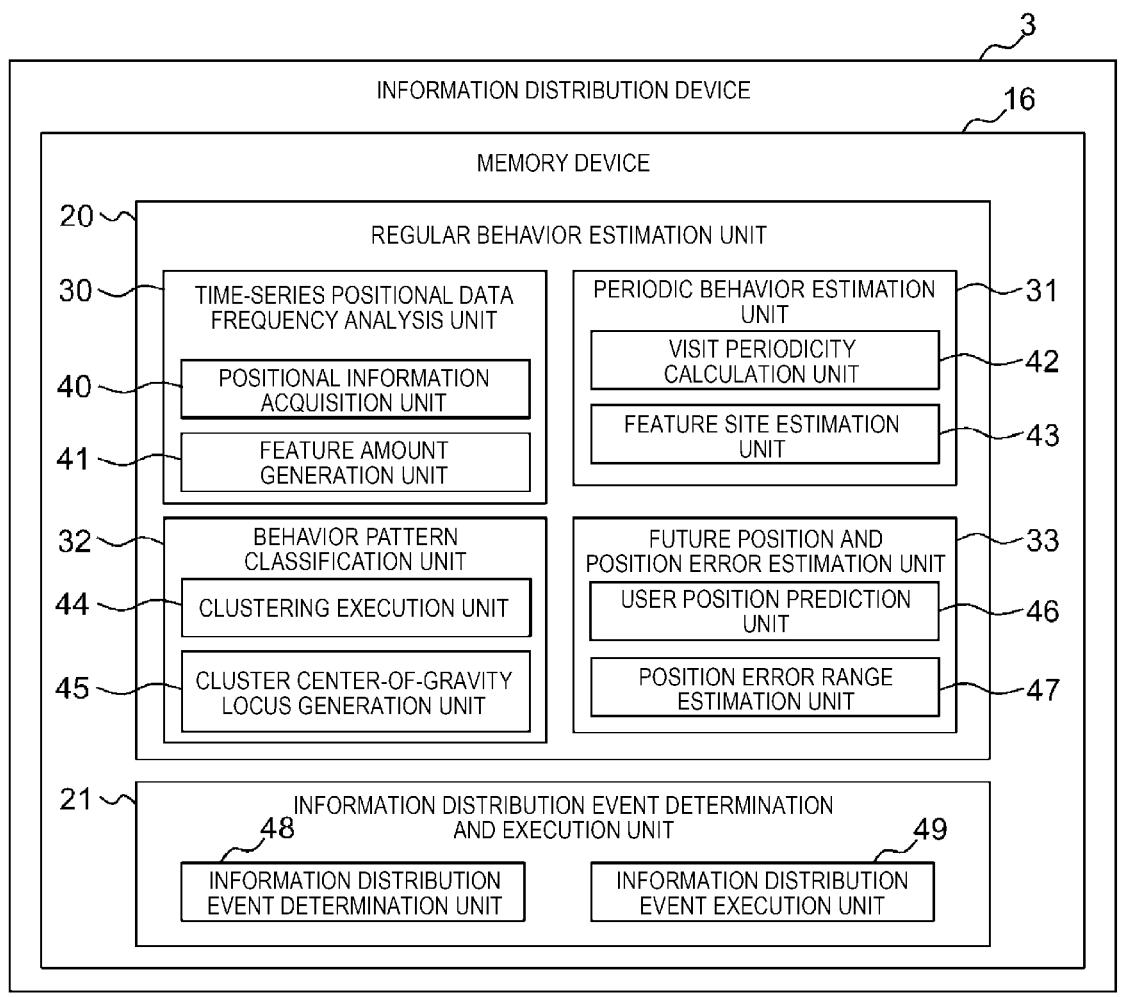

[Fig. 3]

USER POSITIONAL INFORMATION TABLE 22

| USER ID 22A | ITEM 22B | | VALUE 22C |
|---|---|---|---|
| USER ID = 1 | TIME STAMP 22D | | {2015-01-01 09:00, 2015-01-01 09:05, ...} |
| | POSITIONAL INFORMATION 22E | LATITUDE 22F | {35.451414, 35.451416, ...} |
| | | LONGITUDE 22G | {139.632177, 139.635137, ...} |
| | | POSITION MEASUREMENT ERROR 22H | {10.0m, 10.0m, ...} |
| USER ID = 2 | TIME STAMP 22D | | {2015-01-01 09:00, 2015-01-01 09:05, ...} |
| | POSITIONAL INFORMATION 22E | LATITUDE 22F | {36.451414, 36.451416, ...} |
| | | LONGITUDE 22G | {138.632177, 138.635137, ...} |
| | | POSITION MEASUREMENT ERROR 22H | {50.0m, 40.0m, ...} |
| ... | ... | | ... |

[Fig. 4]

FEATURE SITE ESTIMATION RESULT TABLE   23X

| SITE ID | ATTRIBUTE | ITEM | VALUE | |
|---|---|---|---|---|
| 1 | HOME | LATITUDE | 35.451414 | }23XE |
| | | LONGITUDE | 139.632177 | }23XF |
| 2 | WORKPLACE | LATITUDE | 35.451416 | }23XE |
| | | LONGITUDE | 139.635137 | }23XF |
| ... | ... | ... | ... | |

DAY CLASSIFICATION INFORMATION TABLE   23Y

| CLUSTER ID | ITEM | | VALUE | | |
|---|---|---|---|---|---|
| CLUSTER k=1 | SAMPLE NUMBER-OF-DAYS | | 23 | }23YD | |
| | SAMPLE DAY ID LIST | | {1,2,3,...,23} | }23YE | |
| | CLUSTER CENTER-OF-GRAVITY | LATITUDE | {35.451414, 35.451416, ...} | }23YG | }23YF |
| | | LONGITUDE | {139.632177, 139.635137, ...} | }23YH | |
| CLUSTER k=2 | SAMPLE NUMBER-OF-DAYS | | 9 | }23YD | |
| | SAMPLE DAY ID LIST | | {6,7,8,...,20} | }23YE | |
| | CLUSTER CENTER-OF-GRAVITY | LATITUDE | {36.451414, 36.451416, ...} | }23YG | }23YF |
| | | LONGITUDE | {139.632177, 139.635137, ...} | }23YH | |

DAY ATTRIBUTE INFORMATION TABLE  23Z

| TYPE OF DAY | WORK DAY FLAG |
|---|---|
| MONDAY | 1 |
| TUESDAY | 1 |
| WEDNESDAY | 1 |
| THURSDAY | 1 |
| FRIDAY | 1 |
| SATURDAY | 0 |
| SUNDAY | 0 |
| FIFTH MONDAY | 0 |
| ... | ... |

USER POSITION PREDICTION INFORMATION TABLE 24

| USER ID | | ITEM | VALUE |
|---|---|---|---|
| USER ID = 1 | | TIME STAMP | {2015-01-01 09:00, 2015-01-01 09:05, ...} |
| | POSITIONAL INFORMATION | LATITUDE | {35.451949, 35.451456, ...} |
| | | LONGITUDE | {139.632133, 139.635154, ...} |
| | | ESTIMATION ERROR | {10.0m, 10.0m, ...} |
| USER ID = 2 | | TIME STAMP | {2015-01-01 09:00, 2015-01-01 09:05, ...} |
| | POSITIONAL INFORMATION | LATITUDE | {36.451414, 36.451416, ...} |
| | | LONGITUDE | {138.632177, 138.635137, ...} |
| | | ESTIMATION ERROR | {50.0m, 40.0m, ...} |
| ... | | ... | ... |

DISTRIBUTION CANDIDATE INFORMATION TABLE 25

| DISTRIBUTION INFORMATION ID | ATTRIBUTE ITEM | | | | DISTRIBUTION INFORMATION CONTENT |
| --- | --- | --- | --- | --- | --- |
| | DAY ATTRIBUTE | PERIOD OF TIME | WORKPLACE FLAG | HOME FLAG | |
| 1 | WORK DAY | 9:00-12:00 | 1 | 0 | LUNCH INFORMATION NEAR WORKPLACE |
| 2 | WORK DAY | 16:00-20:00 | 1 | 0 | BAR INFORMATION NEAR WORKPLACE |
| 3 | DAY-OFF | 9:00-12:00 | 0 | 0 | CAFÉ INFORMATION (RANDOM) |
| 4 | DAY-OFF | 9:00-12:00 | 0 | 1 | CAFÉ INFORMATION NEAR HOME |
| 5 | DAY-OFF | 9:00-12:00 | 1 | 0 | MESSAGE SUCH AS "THANKS FOR YOUR HARDWORKING ON HOLIDAY" |
| ... | ... | ... | ... | ... | ... |

25A / 25D / 25E / 25F / 25G / 25C
25B (ATTRIBUTE ITEM grouping)

[Fig. 9]
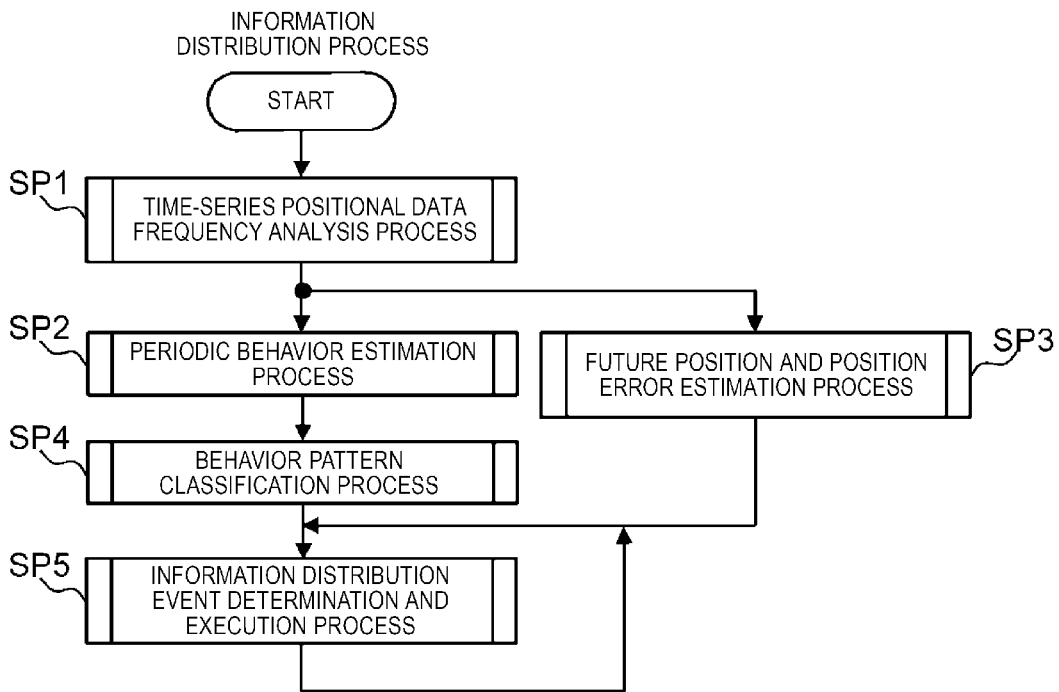
[Fig. 10]
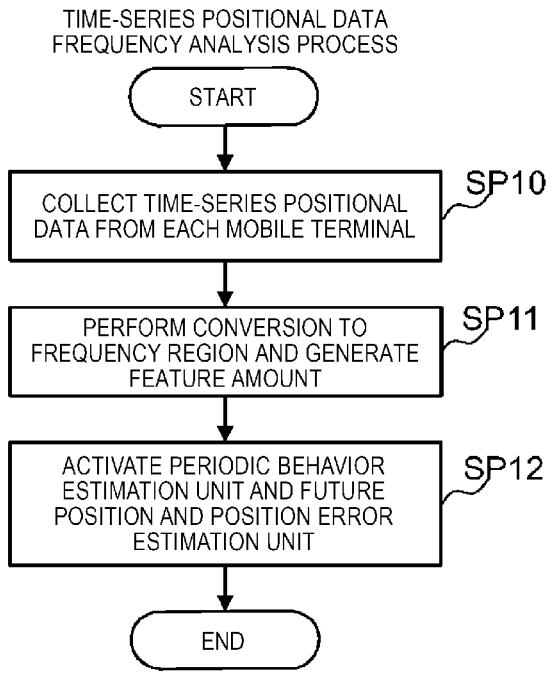

[Fig. 11]
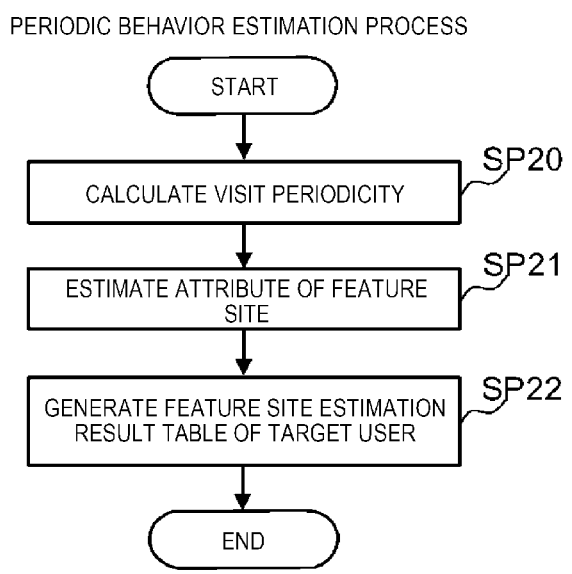

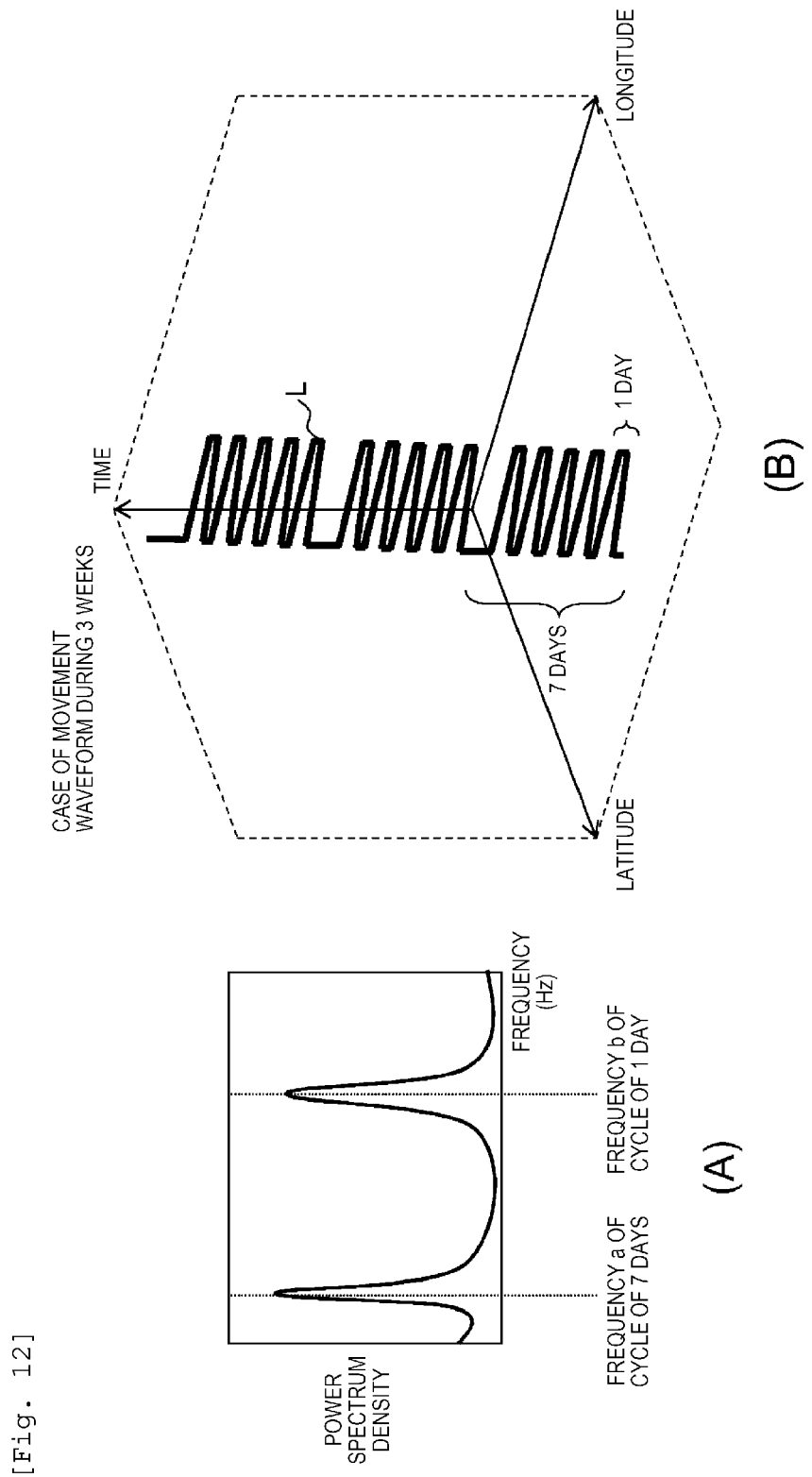

[Fig. 13]
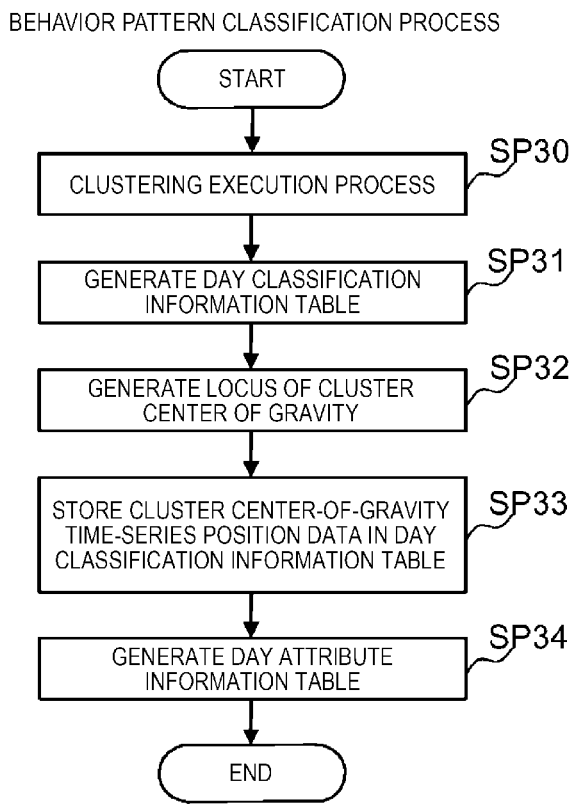
[Fig. 14]
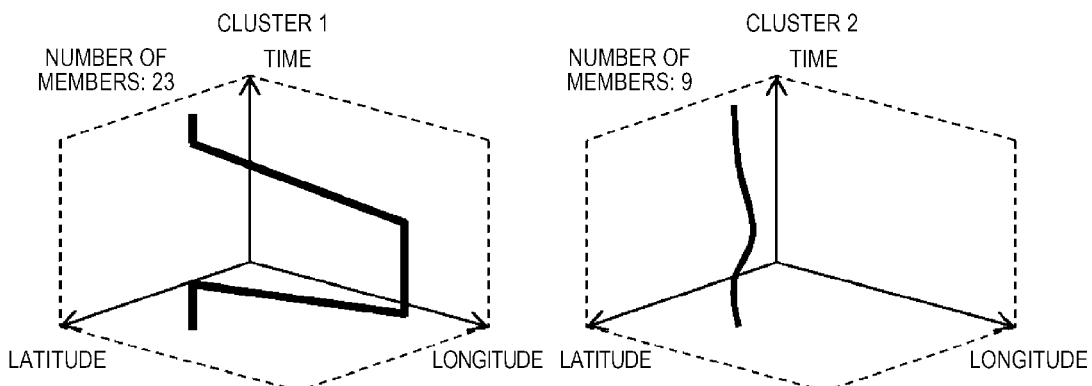

[Fig. 15]
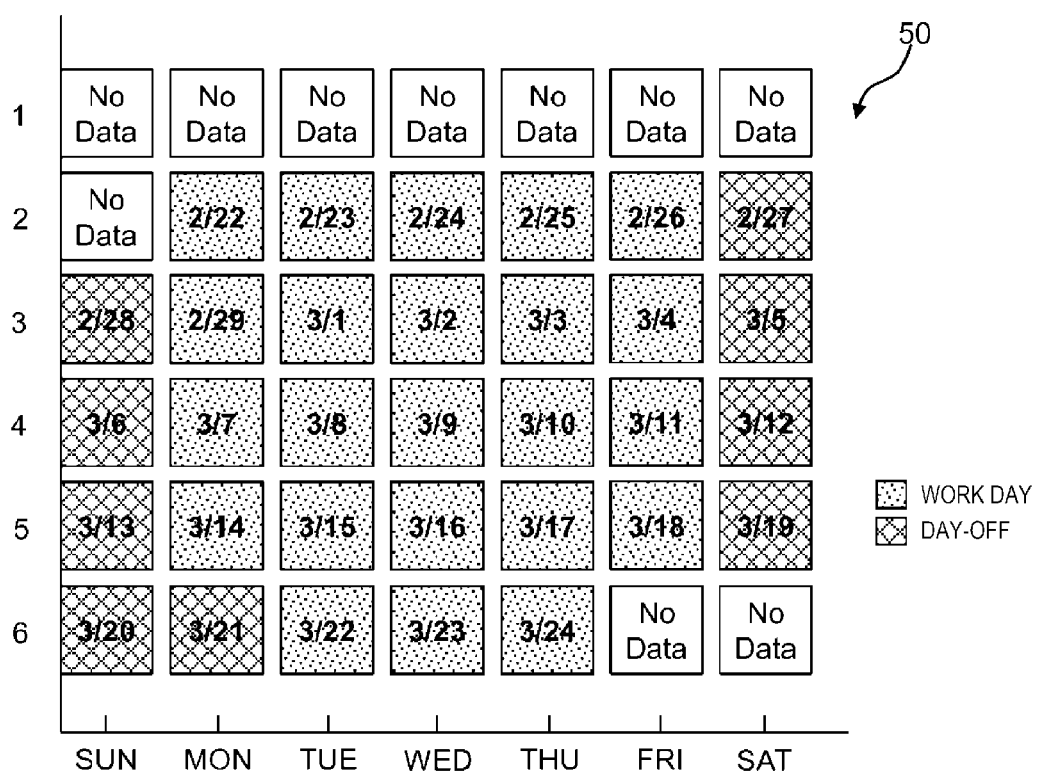

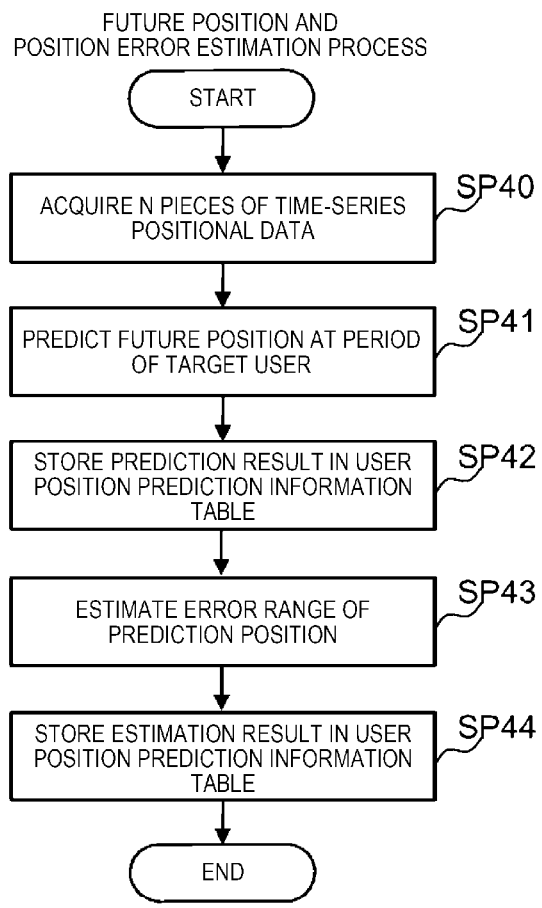
[Fig. 16]

[Fig. 17]

| 2015/1/1 0:00~0:05 | 2015/1/1 0:05~0:10 | 2015/1/1 0:10~0:15 | 2015/1/1 0:15~0:20 | 2015/1/1 0:20~0:25 | ... | 2015/12/31 23:55~24:00 | 2016/1/1 0:00~0:05 | 2016/1/1 0:05~0:10 |
|---|---|---|---|---|---|---|---|---|
| (x1,y1) | (x2,y2) | (x3,y3) | (x4,y4) | (x5,y5) | | (xi,yi) | PREDICTED VALUE | PREDICTED VALUE |

GENERATE AUTO REGRESSION MODEL

CALCULATE PREDICTED VALUE

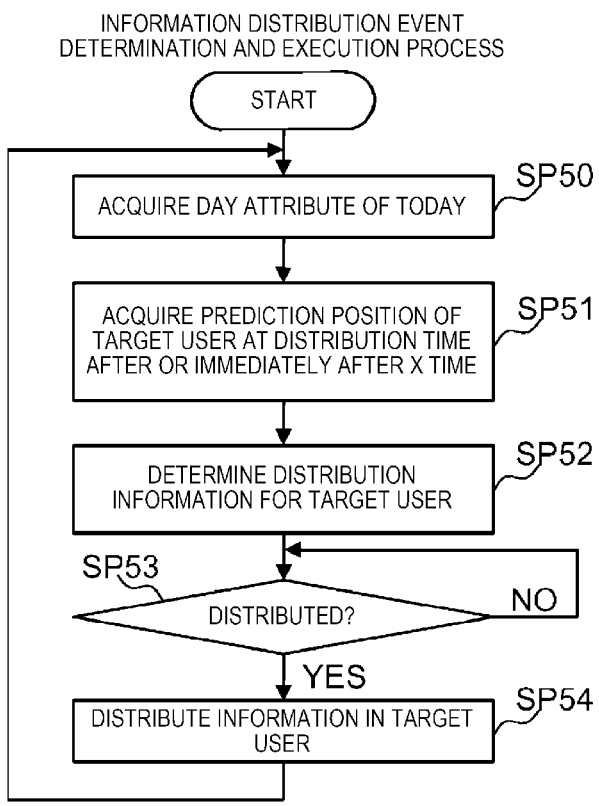
[Fig. 18]

INFORMATION PROCESSING DEVICE AND METHOD

TECHNICAL FIELD

The present invention relates to an information processing device and method and is suitable to be applied to an information distribution system distributing information beneficial to a user to, for example, a mobile terminal such as a smartphone or a mobile phone terminal.

BACKGROUND ART

In recent years, most mobile terminals such as mobile phones have a positioning function such as Global Positioning System (GPS). Thus, users of the mobile terminals can acquire current positional information on the basis of positioning results of the mobile terminals and can receive various kinds of service information according to current positions of the users by transmitting the positioning results to communication providers or information distribution devices of service providers via networks.

As a technology for acquiring positional information of users, there is known a method disclosed in PTL 1. PTL 1 discloses a method of acquiring a user position by capturing a coordinate position of latitude and longitude of a mobile phone on the basis of triangulation carried out transmitting a plurality of signals to the mobile phone, signal intensities of a plurality of signals, a difference between incoming times of different signals, a difference between incoming angles of different signals, GPS signals, and a combination thereof.

To effectively perform service information distribution according to one piece of information of a user, distribution of service information according to a location and a time at which the user visits in future is required to be performed. Therefore, it is preferable to estimate areas which users are highly likely to visit in future and then perform distributing service information accordingly.

As technologies for estimating areas which users are highly likely to visit in future and distributing service information according to the areas, technologies disclosed in PTL 2 to PTL 4 have been proposed in the related art.

For example, in PTL 2, a location transition model between staying locations in which transition patterns between staying locations of users are extracted and an appearance probability of the transition pattern is associated with each transition pattern between staying locations is constructed. Then, PTL 2 discloses that a future position of a user is estimated by retrieving portable terminals that have taken movement routes similar to a movement route of a portable terminal on the basis of longest matching portion sequence lengths of previous staying or residence time-series data and staying or residence time-series data related to other portable terminal.

PTL 3 discloses that two high-order sites with a saying time or a residence frequency of a user are determined as private-related sites such as a home or a workplace and sites at which the user frequently stops by for an average staying time equal to or greater than a threshold are determined as public-related sites. PTL 4 discloses that appropriate advertisement candidates according to the position of a user are built as a database in advance and appropriate advertisements according to the position of the user and a period of time starts to be distributed.

CITATION LIST

Patent literature

PTL 1: JP-A-2002-199423
PTL 2: JP-A-2015-49681
PTL 3: JP-A-2011-154004
PTL 4: JP-A-2015-114755

SUMMARY OF INVENTION

Technical Problem

PTL 2, PTL 3, and PTL 4 disclose that a future route or a staying site of a certain user is predicted using previous route data of the user or another person and an event such as distribution of information is generated on the basis of the predicted route information.

Incidentally, behavior patterns of people typically differ depending on a difference in a day or a period of time, for example, a work day or a holiday. Even on the same work day, behavior patterns differ every day, for example, when people go for learning after work. For this reason, in a method of predicting an existence probability at each site from route data for a previous whole period, there is a problem that a difference in a behavior may not be predicted according to a difference in such as a day or a period of time. To perform effective information distribution to a user of a mobile terminal, it is preferable to distribute information in which an advantageous effect is expected for a period of time in which an advantageous effect of information distribution is expected on the basis of a habitual behavior pattern of an individual user.

The present invention is devised in consideration of the foregoing circumstances and proposes an information processing device and method capable of planning an effective scheme, such as distributing information appropriate to a user.

Solution to Problem

To solve the forgoing problem, the present invention provides an information processing device including a regular behavior estimation unit that collects time-series positional data composed of time-series positional information of a mobile communication body and estimates a regular behavior of a user of the mobile communication body on the basis of the collected time-series positional data of the mobile communication body.

The present invention provides an information processing method including a first step of collecting time-series positional data composed of time-series positional information of a mobile communication body and estimating a regular behavior of a user of the mobile communication body on the basis of the collected time-series positional data of the mobile communication body.

According to the information processing device and method, it is possible to perform efficient information processing such as distributing information tailored for a regular behavior of a user.

Advantageous Effects of Invention

According to the present invention, it is possible to plan an effective scheme such as distributing information appropriate to a user.

BRIEF DESCRIPTION OF DRAWINGS

FIG. 1 is a block diagram illustrating an overall configuration of an information distribution system according to an embodiment.

FIG. 2 is a block diagram illustrating a logic configuration of an information distribution device.

FIG. 3 is a conceptual diagram illustrating a configuration of a user positional information table.

FIG. 4 is a conceptual diagram illustrating a configuration of a feature site estimation result table.

FIG. 5 is a conceptual diagram illustrating a configuration of a day classification information table.

FIG. 6 is a conceptual diagram illustrating a configuration of a day attribute information table.

FIG. 7 is a conceptual diagram illustrating a configuration of a user position prediction information table.

FIG. 8 is a conceptual diagram illustrating a configuration of a distribution candidate information table.

FIG. 9 is a flowchart illustrating a process procedure of an information distribution process.

FIG. 10 is a flowchart illustrating a process procedure of a time-series position data frequency analysis process.

FIG. 11 is a flowchart illustrating a process procedure of a periodic behavior estimation process.

FIGS. 12A and 12B are diagrams illustrating feature curves provided to describe the periodic behavior estimation process.

FIG. 13 is a flowchart illustrating a process procedure of a behavior pattern classification process.

FIG. 14 is a diagram illustrating a feature curve provided to describe a cluster.

FIG. 15 is a conceptual diagram illustrating a day attribute calendar.

FIG. 16 is a flowchart illustrating a process procedure of a future position and position error estimation process.

FIG. 17 is a conceptual diagram for describing an auto regression model.

FIG. 18 is a flowchart illustrating a process procedure of an information distribution event determination and execution process.

DESCRIPTION OF EMBODIMENTS

Hereinafter, an embodiment of the present invention will be described in detail with reference to the drawings.

(1) Configuration of Information Distribution System According to Embodiment

In FIG. 1, reference numeral 1 denotes an information distribution system according to the embodiment as a whole. The information distribution system 1 includes a single mobile terminal or a plurality of mobile terminals 2 and an information distribution device 3 which is an information device, which are connected to be able to communicate with each other via a network 6 and a wireless communication network formed by a wireless base station 4, a switching station 5, and the like.

The mobile terminal 2 includes a portable communication terminal device such as a mobile phone on which a positioning function is mounted and includes a central processing unit (CPU) 10, a memory device 11, a communication device 12, an input and output device 13, and a positioning device 14.

The CPU 10 is a processor that performs operation control of the whole mobile terminal 2. The memory device 11 includes a semiconductor memory and is mainly used to store and retain various programs. When the CPU 10 executes a program stored in the memory device 11, various processes are executed in the whole mobile terminal 2, as described below. The communication device 12 has a function of performing wireless communication with the wireless base station 4 in conformity to a communication scheme that conforms to a predetermined wireless communication standard.

The input and output device 13 includes an input device which is hardware used for a user of the mobile terminal 2 (hereinafter this is simply referred to as a terminal user) to perform various operation inputs and an output device that is hardware outputting an image or audio. As the input device, for example, a button and a cross key or a touch panel is applied. As the output device, for example, a liquid crystal panel and a speaker are applied.

The positioning device 14 has a function of receiving signals transmitted from a plurality of GPS satellites and positioning a current position of the mobile terminal 2 on the basis of the received signals. Position data indicating the current position of the mobile terminal 2 (hereinafter referred to as a current position of a user carrying the mobile terminal 2) positioned by the positioning device 14 is accumulated in the memory device 11, and the stored positional data of time-series is transmitted as time-series positional data to the information distribution device 3 via the wireless communication network and the network 6 by the communication device 12.

The wireless base station 4 is terminal equipment of a mobile phone network performing direct communication with the mobile terminal 2, and converts a wireless signal transmitted from the mobile terminal 2 into a signal confirming to a communication standard of the mobile phone network and output the signal to the switching station 5 or converts a signal given from the switching station 5 into a wireless signal conforming to the wireless communication standard and transmits the wireless signal to the mobile terminal 2 of a transmission destination.

The switching station 5 is equipment that forms a part of the mobile phone network, and converts a signal given from the wireless base station 4 into a signal conforming to a communication standard of the network 6 and transmits the signal to the information distribution device 3 via the network 6 or converts a signal given from the information distribution device 3 via the network 6 into a signal conforming to the communication standard of the wireless communication network and output the signal to the wireless base station 4.

The network 6 includes, for example, a local area network (LAN), the Internet, a public line, or a dedicated line. Communication between the switching station 5 and the information distribution device 3 via the network 6 is performed according to Transmission Control Protocol/Internet Protocol (TCP/IP), for example, when the network 6 is a LAN or the Internet.

The information distribution device 3 is a server device that distributes the current position of a user or optimum service information according to a preference for the user on the basis of time-series positional data collected from each mobile terminal 2 and includes a CPU 15, a memory device 16, a communication device 17, and an input and output device 18.

The CPU 15 is a processor that performs operation control of the whole information distribution device 3. The memory device 16 includes a semiconductor memory or a hard disk device and is used to store and retain various programs or various kinds of data. When the CPU 15 executes a program stored in the memory device 16, various processes are executed in the whole information distribution device 3, as described below.

The communication device 17 is an interface that performs protocol control when the information distribution device 3 performs communication with the switching station 5 via the network 6 and includes a network interface card (NIC).

The input and output device 18 includes an input device and an output device. The input device is hardware used for a user to perform various operation inputs. For example, a keyboard, a mouse, or a touch panel is applied. The output device is hardware that outputs an image or audio. For example, a liquid crystal display and a speaker are applied.

(2) Information Distribution Function According to Embodiment

Next, an information distribution function mounted on the information distribution device 3 according to the embodiment will be described. The information distribution function is a function of predicting a regular behavior of a user on the basis of daily time-series positional data for a certain period (for example, one year) of the user for each user and performing planning of information distribution to the user on the basis of a prediction result.

As means for realizing such an information distribution function, as illustrated in FIG. 2, the memory device 16 of the information distribution device 3 stores a regular behavior estimation unit 20 and an information distribution event determination and execution unit 21 as programs. As illustrated in FIG. 1, a user positional information table 22, a user attribute information database 23, a user position prediction information table 24, a distribution candidate information table 25, and a distribution information database 26 are stored as tables and a database for managing necessary information.

The regular behavior estimation unit 20 is a program that has a function of ascertaining a regular behavior pattern of a user on the basis of previous time-series positional data of the user and predicting a future position of the user. As illustrated in FIG. 2, the regular behavior estimation unit 20 includes a time-series positional data frequency analysis unit 30, a periodic behavior estimation unit 31, a behavior pattern classification unit 32, and a future position and position error estimation unit 33.

Of these units, the time-series positional data frequency analysis unit 30 is a module group that has a function of performing frequency analysis on daily time-series positional data of the user and calculating a feature amount of the daily time-series positional data for each user, and includes a positional information acquisition unit 40 and a feature amount generation unit 41.

The positional information acquisition unit 40 is a module that has a function of collecting, as movement information of the user, time-series positional data (positional information for 1 day) of positional information (latitude and longitude) of the user positioned at a given time interval (for example, an interval of 5 minutes) by the positioning device 14 (see FIG. 1) of each mobile terminal 2. The positional information acquisition unit 40 collects the daily time-series positional data retained by the mobile terminal 2 by transmitting a request for transmitting the time-series positional data to each mobile terminal 2 periodically or aperiodically and manages and register the collected time-series positional data in the user positional information table 22. Here, each mobile terminal 2 may transmits the time-series positional data to the information distribution device 3 periodically or aperiodically and the positional information acquisition unit 40 may manage and register the time-series positional data in the user positional information table 22.

The feature amount generation unit 41 is a module that has a function of generating each feature amount of the daily time-series positional data of a user for each user on the basis of the time-series positional data of each user acquired by the positional information acquisition unit 40.

The periodic behavior estimation unit 31 is a module group that has a function of detecting a periodic behavior of a user for each user and includes a visit periodicity calculation unit 42 and a feature site estimation unit 43.

The visit periodicity calculation unit 42 is a module that has a function of calculating periodicity of a behavior of a user on the basis of the daily time-series positional data of the user for each user.

The feature site estimation unit 43 is a module that has a function of calculating periodicity of visit for each site (hereinafter this is referred to as visit periodicity) which a user periodically visits (hereinafter this is referred to as a feature site) on the basis of periodicity of a behavior of the user calculated by the visit periodicity calculation unit 42 and estimating an attribute (home, workplace, or the like) of the feature site on the basis of a calculation result. The feature site estimation unit 43 stores and manages the estimated attribute and position (latitude and longitude) of each site in a feature site estimation result table 23X to be described with reference to FIG. 4.

The behavior pattern classification unit 32 is a module group that has a function of classifying daily behaviors of a user into several behavior patterns and includes a clustering execution unit 44 and a cluster center-of-gravity locus generation unit 45.

The clustering execution unit 44 is a module that has a function of executing a clustering process of classifying the daily time-series positional data of the user into a plurality of clusters for each user on the basis of a feature amount of the daily time-series positional data of the user generated by the time-series positional data frequency analysis unit 30. The clustering execution unit 44 stores a processing result of the clustering process in a day classification information table 23Y of the user attribute information database 23 to be described with reference to FIG. 5.

The cluster center-of-gravity locus generation unit 45 is a module that has a function of generating a locus of the cluster center of gravity for each cluster of the user generated by the clustering execution unit 44 and storing the locus of a cluster center of gravity of each of the generated clusters in the day classification information table 23Y for each user. The locus of the cluster center of gravity of each cluster generated by the cluster center-of-gravity locus generation unit 45 is displayed on the input and output device 18 (see FIG. 1) as necessary. The cluster center-of-gravity locus generation unit 45 estimates an attribute indicating whether a day of the week and a date is a work day (hereinafter this is referred to as a day attribute) for each day of the week or each date on the basis of the attribute and the position of each feature site stored in the feature site estimation result table 23X and the locus of the cluster center of gravity of each cluster stored in the day classification information table 23Y and storing an estimation result in a day attribute information table 23Z to be described with reference to FIG. 6.

The future position and position error estimation unit 33 is a module that has a function of estimating the position of a user in future at a given time (for example, 5 minutes) (hereinafter this is referred to a future position) and a prediction error of the future position and includes a user position prediction unit 46 and a position error range estimation unit 47.

The user position prediction unit 46 is a module that has a function of predicting a future position of the user. The future position of the user predicted by the user position prediction unit 46 is stored and managed in the user position prediction information table 24 to be described with reference to FIG. 7. The position error range estimation unit 47 is a module that has a function of estimating an error range of the future position of the user predicted by the user position prediction unit 46. The error range estimated by the position error range estimation unit 47 is also stored and managed in the user position prediction information table 24.

Further, the information distribution event determination and execution unit 21 is a program that has a function of determining information to be distributed to the user and distributing the determined information to the user for each user. The information distribution event determination and execution unit 21 includes an information distribution event determination unit 48 and an information distribution event execution unit 49, as illustrated in FIG. 2.

The information distribution event determination unit 48 is a module that has a function of determining information to be distributed to a user for each user on the basis of the future position of the user predicted by the future position and position error estimation unit 33 and the distribution candidate information table 25 to be described with reference to FIG. 8. The information distribution event execution unit 49 is a module that has a function of executing an information distribution event for distributing each piece of information to each user according to a determination result of the information distribution event determination 48.

On the other hand, the user positional information table 22 is a table that is used to manage the daily time-series positional data of each user collected from each mobile terminal 2 by the positional information acquisition unit 40 of the behavior pattern classification unit 32 described above with reference to FIG. 2. As illustrated in FIG. 3, a user ID field 22A includes an item field 22B and a value field 22C.

In the user ID field 22A, an identifier (user ID) unique to the user and granted to the user of each mobile terminal 2 of which the time-series positional data is collected by the information distribution device 3 is stored.

The item field 22B is divided into a time stamp field 22D and a positional information field 22E. The positional information field 22E is further divided into a latitude field 22F, a longitude field 22G, and a position measurement error field 22H. In the value field 22C, values of a corresponding item are stored.

Specifically, in the value field 22C corresponding to the time stamp field 22D, lists arranged in a chronological order in which positional data included in the corresponding time-series positional data of the user is acquired by the positioning device 14 (see FIG. 1) of the mobile terminal 2 for each given time (5 minutes in FIG. 3) are stored. In the value field 22C corresponding to each of the latitude field 22F and the longitude field 22G, a list in which values of corresponding one of latitude and longitude acquired by the positioning device 14 at the time are arranged in chronological order is stored. Further, in the value field 22C corresponding to the position measurement error field 22H, a list in which position measurement errors in a case in which a position measurement error of the positioning device 14 at each time can be recognized are arranged in chronological order is stored.

Accordingly, the case of the example of FIG. 3 shows that, for a user who has the user ID of "1", positional data obtained by performing positioning at "2015-01-01 09:00", "2015-01-01 09:05", . . . is collected as time-series positional data, the positioning result of "2015-01-01 09:00" is a position measurement error of "10.0 m" at the latitude of "35.451414" and the longitude of "139.632177", and the positioning result of "2015-01-01 09:05" is a position measurement error of "10.0 m" at the latitude of "35.451416" and the longitude of "139.635137".

The user attribute information database 23 includes the feature site estimation result table 23X illustrated in FIG. 4, the day classification information table 23Y illustrated in FIG. 5, and the day attribute information table 23Z illustrated in FIG. 6.

The feature site estimation result table 23X is a table used to manage an attribute (home, workplace, or the like) and a position of each feature site regarding the user estimated by the feature site estimation unit 43 (see FIG. 2) of the above-described periodic behavior estimation unit 31 (see FIG. 2) and is generated for each user. The feature site estimation result table 23X includes a site ID field 23XA, an attribute field 23XB, an item field 23XC, and a value field 23XD, as illustrated in FIG. 4.

In the site ID field 23XA, an identifier (site ID) unique to a feature site granted to each feature site regarding the user corresponding and estimated by the feature site estimation unit 43 is stored. In the attribute field 23XB, an attribute of the feature site estimated by the feature site estimation unit 43 is stored.

The item field 23XC is divided into a latitude field 23XE and a longitude field 23XF. Values of an item corresponding to the value field 23XD are stored. Specifically, in the value field 23XD corresponding to the latitude field 23XE, the latitude of the corresponding feature site is stored. In the value field 23XD corresponding to the longitude field 23XF, the longitude of the corresponding feature site is stored.

Accordingly, the case of an example of FIG. 4 shows that the feature site of which the site ID is "1" is estimated to be "home" by the feature site estimation unit 43 and the position indicates that the latitude is "35.451414" and the longitude is "139.632177".

The day classification information table 23Y is a table that is used to manage a processing result of a clustering process performed by the clustering execution unit 44 (see FIG. 2) of the behavior pattern classification unit 32 (see FIG. 2) and a locus of a cluster center of gravity of each cluster generated by the cluster center-of-gravity locus generation unit 45 and is generated for each user. The day classification information table 23Y includes a cluster ID field 23YA, an item field 23YB, and a value field 23YC, as illustrated in FIG. 5.

In the cluster ID field 23YA, an identifier (cluster ID) unique to a cluster granted to each cluster generated through the clustering process is stored.

The item field 23YB is divided into a sample number-of-days field 23YD, a sample day ID list field 23YE, and a cluster center-of-gravity field 23YF. The cluster center-of-gravity field 23YF is divided into a latitude field 23YG and a longitude field 23YH. In the value field 23YC, values of corresponding items are stored.

Specifically, in the value field 23YC corresponding to the sample number-of-days field 23YD, the number of days (number of days) belonging to a cluster corresponding to a predetermined period (1 year in the embodiment, but a period in which there is the data in the case where there is the data for less than 1 year) is stored. In the value field 23YC corresponding to the sample day ID list field 23YE, a list in which dates of days belonging to the cluster are arranged is stored. In the value field 23YC corresponding to the latitude field 23YG of the cluster center-of-gravity field 23YF, a list of the latitudes of the positions of the cluster centers of gravity (hereinafter this is referred to as a cluster center-of-gravity position) calculated on the basis of the positional data collected at the same time of each day belonging to the corresponding cluster is stored. In the value field 23YC corresponding to the longitude field 23YH of the cluster center-of-gravity field 23YF, a list which is a list of longitudes of the cluster center-of-gravity positions is stored.

Accordingly, the case of the example of FIG. 5 shows that a cluster to which the cluster ID of "1" is granted indicates the number of days belonging to the cluster is "23", dates of the days are "1, 2, 3, . . . , 23", and the latitude and the longitude of the cluster center of gravity at each time are "35.451414, 139.632177", "35.451416, 139.635137", . . . in sequence.

The day attribute information table 23Z is a table that is used to manage day attribute information of the user estimated by the feature site estimation unit 43 (see FIG. 2) and is generated for each user. The day attribute information table 23Z includes a day type field 23ZA and a work day flag field 23ZB, as illustrated in FIG. 6.

In the day type field 23ZA, types of days such as each day of the week (Monday to Sunday) and a specific date (fifth Monday or the like) are stored. In the work day flag field 23ZB, a flag indicating an attribute work (hereinafter this is referred to as a work day flag) of the corresponding type of day (hereinafter this is referred to as day attribute) regarding whether a day of the week or a date with the corresponding type of day is a work day is stored. The work day flag is set to "1" when the corresponding day of the week or date is estimated to be a work day. The work day flag is set to "0" when the corresponding day of the week or data is estimated not to be a work day.

Accordingly, the case of the example of FIG. 6 shows that "Monday" to "Friday" during one week are work days (the work day flag is set to "1"), "Saturday" and "Sunday" are not work days (the work day flag is set to "0") and "Fifth Monday" is estimated not to be a work day either with regard to the corresponding user.

The user position prediction information table 24 is a table that is used to manage the position (future position) of each user for each future given time (at intervals of 5 minutes) predicted by the user position prediction unit 46 (see FIG. 2) of the future position and position error estimation unit 33 (see FIG. 2) and an error of the future positions estimated by the position error range estimation unit 47 (see FIG. 2). The user position prediction information table 24 has the same configuration as the user positional information table 22 (see FIG. 3), as illustrated in FIG. 7.

In a user ID field 24A of the user position prediction information table 24, a user ID of a user granted to the user of each mobile terminal 2 of which the time-series positional data is collected by the information distribution device 3 is stored.

An item field 24B is divided into a time stamp field 24D and a positional information field 24E. The positional information field 24E is further divided into a latitude field 24F, a longitude field 24G, and an estimation error field 24H. In a value field 24C, values of a corresponding item are stored.

Specifically, in the value field 24C corresponding to the time stamp field 24D, a list arranged in a chronological order in which times of a future given time (5 minutes) (herein-after this is referred to as a future time) at which the position of the corresponding user is predicted are arranged is stored. In the value field 24C corresponding to each of the latitude field 24F and the longitude field 24G, a list in which values of each latitude (in the case of the value field 24C corresponding to the latitude) or each longitude (in the case of the value field 24C corresponding to the longitude) at which the corresponding user is predicted to be located in the future times are arranged in chronological order is stored. Further, in the value field 24C corresponding to the estimation error field 24H, a list in which future times corresponding to errors of the future positions of the corresponding user at the future times estimated by the position error range estimation unit 47 are arranged in chronological order is stored.

Accordingly, the case of the example of FIG. 7 shows that, for the user who has the user ID of "1", future positions of the user at "2015-01-01 09:00", "2015-01-01 09:05", . . . which are future times are stored, the user is predicted to be located at the position of the latitude of "35.451414 and the longitude of "139.632177 with the positional error is "10.0 m" at "2015-01-01 09:00", and the user is predicted to be located at the position of the latitude of "35.451416 and the longitude of "139.635137 with the positional error is "10.0 m" at "2015-01-01 09:05".

The distribution candidate information table 25 is a table that is used to manage information of a distribution candidate to be distributed to a user (hereinafter, this is referred to as distribution candidate information) according to the predicted future position or the like of the user. The distribution candidate information table 25 includes a distribution information ID field 25A, an attribute item field 25B, and a distribution information content field 25C, as illustrated in FIG. 8.

In the distribution information ID field 25A, an identifier (distribution information ID) unique to each piece of distribution candidate information and granted to the distribution candidate information is stored. In the distribution information content field 25C, content of the distribution candidate information to which the corresponding distribution information ID is granted is stored.

The attribute item field 25B is divided into a day attribute field 25D, a period-of-time field 25E, a workplace flag field 25F, and a home flag field 25G. In the day attribute field 25D, information regarding a day on which the corresponding distribution candidate information is distributed (in the embodiment, "work day" or "day-off") is stored. In the period-of-time field 25E, a period of time in which the distribution candidate information is to be distributed is stored. In the workplace flag field 25F, a flag indicating whether the distribution candidate information corresponding to a case in which the user is predicted to be at his or her workplace ("1" when the distribution candidate information is to be transmitted, and "0" when the distribution candidate information is not to be transmitted) is stored. In the home flag field 25G, a flag indicating whether the distribution candidate information corresponding to a case in which the user is predicted to be in his or her home is transmitted ("1" when the distribution candidate information is to be transmitted, and "0" when the distribution candidate information is not to be transmitted) is stored.

Accordingly, the case of the example of FIG. 8 shows that when a user is predicted to be at his or her workplace in the period of time of "9:00 to 12:00" of the "work day" of the user (the value of the "workplace flag field" is "1" and the value of the home flag field is "0"), "lunch information near the workplace" is specified as a candidate of the information (distribution candidate information) to be distributed to the user.

The distribution information database 26 is a database in which kinds of information (lunch information, dinner information, bar information, café information, and the like) requested to be distributed by a sponsor, specific content of the information, and a distribution area of the information requested by the sponsor are registered in association therewith for each sponsor that requests the user to distribute the lunch information, the dinner information, and the like using the information distribution service according to the embodiment. The detailed description of the distribution information database 26 will be omitted.

(3) Various Processes Related to Information Distribution Function

Next, processing content of various processes performed by the information distribution device 3 with regard to the information distribution function according to the embodiment will be described. Hereinafter, a main unit processing various processes will be described as a program or a module. In practice, it is needless to say that the CPU 15 (see FIG. 1) performs the processes on the basis of the program or the module.

(3-1) Flow of Process Related to Information Distribution Function

FIG. 9 illustrates a flow of a series of processes related to the information distribution function (hereinafter this is referred to as an information distribution process) according to the embodiment. The information distribution process is performed periodically (for example, a cycle of 1 year).

When the information distribution process starts, the time-series positional data frequency analysis unit 30 (see FIG. 2) first collects daily time-series positional data for a given period (for example, 1 year) accumulated by each mobile terminal 2 from each mobile terminal 2, performs frequency conversion on the daily time-series positional data of the user for each user corresponding to each mobile terminal 2, and performs a time-series positional data frequency analysis process of generating each feature amount of the daily time-series positional data subjected to the frequency conversion (SP1). Then, the time-series positional data frequency analysis unit 30 subsequently activates the periodic behavior estimation unit 31 (see FIG. 2) and the future position and position error estimation unit 33 (see FIG. 2).

When activated by the time-series positional data frequency analysis unit 30, the periodic behavior estimation unit 31 performs a periodic behavior estimation process of estimating each position and attribute (home, workplace, or the like) of each feature site to which the user periodically visits on the basis of the daily time-series positional data of the user for each user (SP2). Then, the periodic behavior estimation unit 31 subsequently activates the behavior pattern classification unit 32 (see FIG. 2).

When the behavior pattern classification unit 32 is activated by the periodic behavior estimation unit 31, the behavior pattern classification unit 32 classifies the time-series positional data into a plurality of clusters (that is, classifies the movement pattern of 1 day of the user into the plurality of clusters) for each user on the basis of the feature amount of the daily time-series positional data of the user generated by the time-series positional data frequency analysis unit 30 and performs a behavior pattern classification process of estimating a day attribute (behavior pattern) for each day of the week and each day on the basis of the classification result, and information regarding the attribute and the position of each feature site estimated by the periodic behavior estimation unit 31 (SP4). Then, when the behavior pattern classification process ends, the behavior pattern classification unit 32 notifies the information distribution event determination and execution unit 21 (see FIG. 2) that the behavior pattern classification process ends.

When activated by the time-series positional data frequency analysis unit 30, the future position and position error estimation unit 33 performs a future position and position error estimation process of predicting a future position for each given period (in the embodiment, 5 minutes) of the user for each user on the basis of the daily time-series positional data of the user and estimating a prediction error of the position (SP3). Then, when the future position and position error estimation process ends, the future position and position error estimation unit 33 notifies the information distribution event determination and execution unit 21 that the future position and position error estimation process ends.

When the behavior pattern classification unit 32 notifies the information distribution event determination and execution unit 21 that the behavior pattern classification process ends and the future position and position error estimation unit 33 notifies the information distribution event determination and execution unit 21 that the future position and position error estimation process ends, the information distribution event determination and execution unit 21 performs an information distribution event determination and execution process of determining distribution candidate information to be distributed to the user for each user, acquiring information corresponding to the determined distribution candidate information from the distribution information database 26, and distributing the information to the user (SP5). The information distribution event determination and execution unit 21 subsequently performs the information distribution event determination and execution process at intervals of several hours or at each predetermined time.

(3-2) Time-Series Positional Data Frequency Analysis Process

FIG. 10 illustrates a flow of specific processes of the time-series positional data frequency analysis process performed in step SP1 of FIG. 9 by the time-series positional data frequency analysis unit 30.

In the time-series positional data frequency analysis process, the positional information acquisition unit 40 (see FIG. 2) first collects each piece of daily time-series positional data (including a current position) retained by each mobile terminal 2 from each mobile terminal 2 and stores each piece of collected daily time-series positional data in the user positional information table 22 (see FIG. 3) for each user (SP10). Then, the positional information acquisition unit 40 subsequently calls the feature amount generation unit 41 (see FIG. 2).

The feature amount generation unit 41 is called by the positional information acquisition unit 40, the feature amount generation unit 41 generates each feature amount of daily time-series positional data of the user for a given period (in the embodiment, 1 year) stored in the user positional information table 22 for each user (SP11).

At this time, since feature analysis is performed including a position and a movement speed, the feature amount generation unit 41 performs conversion into a frequency region by performing Fourier transform on the daily time-series positional data for each user, and then generates each feature amount of the daily time-series positional data.

Specifically, the feature amount generation unit 41 first converts each piece of positional information (in the embodiment, information regarding latitude and longitude at intervals of 5 minutes) included in the time-series positional data into complex data in which each piece of latitude data is a real part and each piece of longitude data is an imaginary part for each piece of time-series positional data for 1 day. The feature amount generation unit 41 performs Fourier transform on the complex data (the time-series positional data) to convert the complex data into frequency data. Further, the feature amount generation unit 41 generates a feature amount vector by linearly combining the real part and the imaginary part of each piece of positional information converted into the frequency data in the above-described way for each piece of time-series positional data for 1 day and sets the generated feature amount vector as a feature amount of the time-series positional data for 1 day. As another method of generating the feature amount, a feature amount may be set by performing linear combination on latitude data and longitude data of the time-series positional data, performing Fourier transform as real numbers, and converting the data into the frequency data. In this case, since no complex data is used, it is possible to suppress complication of the mounting of a processing program.

Then, the feature amount generation unit 41 subsequently activates the periodic behavior estimation unit 31 and the future position and position error estimation unit 33 (SP12). Thus, the time-series position data frequency analysis process performed by the time-series positional data frequency analysis unit 30 ends.

(3-3) Periodic Behavior Estimation Process

FIG. 11 illustrates a flow of specific processes of the periodic behavior estimation process performed by the periodic behavior estimation unit 31 in step SP2 of FIG. 9. FIG. 11 also illustrates a flow of a periodic behavior estimation process for one personal user. The same periodic behavior estimation process is performed in sequence or in parallel for each user.

The periodic behavior estimation process starts when the periodic behavior estimation unit 31 is activated by the time-series positional data frequency analysis unit 30. The visit periodicity calculation unit 42 first calculates periodicity of visit (hereinafter this is referred to as visit periodicity) to each site to which a targeting user at that time (hereinafter the user is a target user) visits until then (SP20).

Specifically, the visit periodicity calculation unit 42 calculate a power spectrum density (that is, the strength degree of the periodicity (visit periodicity) of movement of the target user) at each frequency illustrated in FIG. 12(A) by acquiring frequency data of the daily time-series positional data of the target user from the feature amount generation unit 41 of the time-series positional data frequency analysis unit 30 and performing power spectrum analysis on the acquired frequency data. Then, the visit periodicity calculation unit 42 subsequently calls the feature site estimation unit 43 (see FIG. 2).

When the feature site estimation unit 43 is called by the visit periodicity calculation unit 42, the feature site estimation unit 43 detects feature sites which the target user periodically visits on the basis of the power spectrum density at each frequency calculated by the visit periodicity calculation unit 42 and a movement locus of the target user indicated by a thick line in FIG. 12(B) and recognized based on the daily time-series position data of the target user stored in the user positional information table 22 (see FIG. 3), and then estimates each attribute of the feature sites (home, workplace, and the like) (SP21).

For example, FIG. 12(B) illustrates a movement locus L (a temporal transition of a position indicated by latitude and longitude) of a certain target user during 3 weeks. In the case of the movement locus, the power spectrum density at each frequency is obtained as in FIG. 12(A). In this example, at the power spectrum density of the target user, a frequency a (=21 days/7 days=3 Hz) representing that the periodicity of the movement is 1 week and the value of a frequency b (=21 days/1 day=21 Hz) representing that the periodicity of the movement is 1 day increase. Therefore, it can be understood that the target user repeats the same movement in a cycle of 1 day and repeats the movement with the periodicity in a cycle of 1 week. On the basis of this information and the movement locus L of the target user indicated by the thick line in FIG. 12(B), it is estimated that, for example, the target user repeats a life of the movement in the cycle of 1 week with which the target user goes to work only during the weekday (Monday to Friday) and does not go to work on Saturday and Sunday and the movement in the cycle of 1 day with which the target user returns home every day.

Accordingly, the feature site estimation unit 43 extracts the value of the frequency indicating that the power spectrum density indicates strength equal to or greater than a predetermined value (the predetermined value is input in advance from the input and output device 18), extracts the feature sites which the target user periodically visits in the cycle of the movement indicated by the extracted frequency from the movement locus L, and determines the attributes of the feature sites on the basis of the value of the frequency. In the case of the example of FIG. 12(A), it is estimated that a site to which the target user visits at the frequency (21 Hz) indicating that the cycle of the movement is 1 day is his or her home, and a site to which the target user moves at the frequency (3 Hz) corresponding to the cycle of 7 days (the site to which the movement in which the days on which the target user does not visit to the site are in the cycle of 7 days) and is indicated to which the target user visits at the frequency (21 Hz) indicating that the cycle of the movement is 1 day is his or her workplace. The movement (the visit) to each site is put in a table for each combination of the user ID and the site ID and is managed with a flag (not illustrated in the drawing). It may be estimated that a site at which the target user is located at night of the weekday is his or her home.

The foregoing feature site estimation unit 43 can automatically extract there is a site (a frequency is 21 days/20 days=1.05 Hz) which the target user visits once for 20 days, for example, when the value of the power spectrum density is equal to or greater than a predetermined value at a frequency of 1.05 Hz. Such a site can be determined and recorded as a feature site for the target user other than his or her home and workplace. This can be managed as a third site in FIG. 4 and can be used under a condition of information distribution managed in the table of FIG. 8.

Then, the feature site estimation unit 43 generates the feature site estimation result table 23X of the target user in which the attribute and the position (latitude and longitude) of the feature site of the target user estimated in this way are stored (SP22).

Through the foregoing processes, the periodic behavior estimation process performed by the periodic behavior estimation unit 31 ends. Then, the feature site estimation unit 43 of the periodic behavior estimation unit 31 subsequently calls the clustering execution unit 44 (see FIG. 2) of the behavior pattern classification unit 32.

(3-4) Behavior Pattern Classification Process

FIG. 13 illustrates a flow of a specific process of the behavior pattern classification process performed by the behavior pattern classification unit 32 in step SP4 of FIG. 9.

FIG. 13 also illustrates a flow of the behavior pattern classification process for one personal user. The same behavior pattern classification process is performed in sequence or in parallel for each user.

The behavior pattern classification process starts, as described above, when the clustering execution unit 44 is called by the feature site estimation unit 43 of the periodic behavior estimation unit 31. When the clustering execution unit 44 is called by the feature site estimation unit 43, the clustering execution unit 44 performs a clustering execution process of classifying the daily time-series positional data subjected to the frequency conversion into a plurality of clusters using a clustering scheme such as a k-means method, a vector quantization method, or a support vector machine on the basis of the feature amount of each daily time-series positional data of the target user generated by the feature amount generation unit 41 (see FIG. 2) of the time-series positional data frequency analysis unit 30 (SP30).

At this time, the clustering execution unit 44 sets the number of clusters and classifies the clusters into 2, 3, 4, . . . in sequence and determines an optimum number of clusters by evaluating similarity of the clusters and separativeness between the clusters at each time.

With the similarity of the clusters, for example, a clustering result of each of clusters 1 to M is evaluated in accordance with a feature amount of the daily time-series positional data of the target user at that time and a distance between cluster centers of gravity of the respective clusters. As a method using a feature amount of the daily time-series positional data of the target user and a distance between the cluster centers of gravity of the respective clusters, for example, a feature amount of each piece of daily time-series positional data in the cluster and a distance between the cluster centers of gravity of the respective clusters or a dispersion of each piece of daily time-series positional data in the cluster and the number of clusters are used for the evaluation.

As such a method, for example, there is an evaluation method using Akaike's information criterion (AIC). The Akaike's information criterion is expressed generally by the following expression when L is a maximum likelihood and K is the number of parameters of the degree of freedom.

$$AIC = -2 \ln L + 2K \qquad (1)$$

The maximum likelihood L is expressed by, for example, the following expression.

$$L = -\sum_{K=1}^{M} \frac{RSS_k}{2d} \qquad (2)$$

In Expression (2), $RSS_k$ indicates a sum of squares of distances from cluster centers of gravity of all the members of a cluster k (here, the daily time-series positional data of the target user) and d indicates a dispersion of the members.

The number K of the parameters of the degree of freedom is expressed by, for example, the following expression.

$$K = M \times D \qquad (3)$$

In Expression (3), M indicates the number of clusters and D indicates dimensionality of a feature amount.

Here, an evaluation criterion (for example, Bayesian information criterion (BIC)) other than Akaike's information criterion can also be used.

The separativeness between the clusters is evaluated using, for example, a distance between the clusters. The distances between the respective clusters are calculated, for example, by calculating boundary surfaces which can separate the clusters from each other with a multiclass support vector machine and an average degree of separation B(N) between the clusters is subsequently calculated by using a sum value of margins (distances) between the respective clusters as $M_N$ by the following expression.

$$B(N) = \frac{M_N}{NC2} \qquad (4)$$

In Expression (4), N indicates the number of clusters.

The average degree of separation B(N) between the clusters is an index indicating the degree of separation between the clusters, as described above. The clusters are separated further as the value of the average degree of separation is larger. As the average degree of separation B(N), any index can be used as the index is an index that increases as an average distance between the respective clusters is larger. An average value between sets {Ck} of the cluster centers of gravity may be applied.

When the execution of the clustering execution process for the daily time-series positional data for the target user ends in this way, the clustering execution unit 44 generates the day classification information table 23Y (see FIG. 5) of the target user who has registered the sample number of days of each clusters and a sample day ID list obtained at this time (SP31). Then, the clustering execution unit 44 subsequently calls the cluster center-of-gravity locus generation unit 45 (see FIG. 2).

When the cluster center-of-gravity locus generation unit 45 is called by the clustering execution unit 44, the cluster center-of-gravity locus generation unit 45 generates time-series positional data of a time domain of the cluster center of gravity of each cluster (hereinafter this is referred to as cluster center-of-gravity time-series positional data) (SP32).

Specifically, the cluster center-of-gravity locus generation unit 45 generates complex data of a frequency domain in which first-half data and second-half data of the cluster center of gravity of a cluster obtained through the above-described clustering execution process are a real part and an imaginary part, respectively for each cluster and performs inverse Fourier transform on the generated complex data to convert the data into the complex data indicating positional information. The cluster center-of-gravity locus generation unit generates the time-series positional data of the cluster center of gravity using the real part and the imaginary part of the complex data (the positional information) as latitude and longitude, respectively. The time-series positional data of the cluster center of gravity of each of the generated clusters can be said to indicate a representative movement pattern of the user in the cluster. A subtle difference between the plurality of movement loci classified to the same cluster can be said to indicate a difference by noise. Extraction of a typical movement pattern from which an influence of noise in this process is excluded is achieved.

The cluster center-of-gravity locus generation unit 45 stores the cluster center-of-gravity time-series positional data of each cluster obtained in this way in the day classification information table 23Y generated in step SP31 (SP33).

The cluster center-of-gravity locus generation unit 45 causes the input and output device 18 (see FIG. 1) to display a waveform based on the cluster center-of-gravity time-series positional data of each cluster in, for example, a format illustrated in FIG. 14, as necessary.

FIG. 14 illustrates an example of a case in which the time-series positional data of the target user is classified into two clusters and illustrates a display example in which the loci of the cluster centers of gravity are drawn on 3-dimensional coordinates of axes of latitude, longitude, and time. By drawing the loci of the cluster centers of gravity on the 3-dimensional coordinates of the axes of the latitude, the longitude, and the time, it is possible to display a representative movement pattern of the user belonging to the clusters as a waveform in consideration of the position and the movement speed. At this time, the cluster center-of-gravity locus generation unit 45 also displays the number of days belonging to each cluster.

Subsequently, the cluster center-of-gravity locus generation unit 45 estimates each day attribute at each day of the week and each date on the basis of the feature site estimation result table 23X (see FIG. 4) of the target user and the day classification information table 23Y (see FIG. 5) of the target user generated in the above-described way, and then generates the day attribute information table 23Z (see FIG. 6) of the target user on the basis of an estimation result (SP34).

Specifically, on the basis of the position and the attribute of each feature site registered in the feature site estimation result table 23X (see FIG. 4) of the target user and the cluster center-of-gravity time-series positional data of each cluster stored in the day classification information table 23Y (see FIG. 5) of the target user, the cluster center-of-gravity locus generation unit 45 estimates that the date belonging to the cluster is a work day when the cluster center of gravity stays for a given time or more at the feature site at which the cluster center of gravity is estimated as the workplace. Otherwise, the cluster center-of-gravity locus generation unit 45 estimates that the date belonging to the cluster is a day-off.

Then, on the basis of an estimation result, the cluster center-of-gravity locus generation unit 45 generates, for example, a calendar (hereinafter this is referred to as a day attribute calendar) 50 in which either a work day or a day-off can be identified on each day illustrated in FIG. 15. FIG. 15 illustrates an example of a case in which since a day on which the time-series positional data of the target user starts to be collected is "2/22" and a current day is "3/24", it may not be determined that days before and after the day are work days or days-off.

Then, on the basis of the day attribute calendar 50 generated in this way, the cluster center-of-gravity locus generation unit 45 estimates that the day attribute of a day is a work day and estimates that the other days of the week and dates are days-off when the number of days estimated to be the work days is greater than the number of days estimated to be the days-off for each day of the week. The cluster center-of-gravity locus generation unit 45 collects the day attribute of each of the same dates of every month, estimates that the day attribute is a day-off on the date when number of days estimated to be days-off is greater than the number of days estimated to be work days on that date, and estimates that the day attributes of the other dates are work days. Then, the cluster center-of-gravity locus generation unit 45 generates the day attribute information table 23Z on the basis of an estimation result.

The behavior pattern classification process performed by the behavior pattern classification unit 32 through the above-described processes ends. Thus, the cluster center-of-gravity locus generation unit 45 subsequently notifies the information distribution event determination and execution unit 21 (see FIG. 2) that the behavior pattern classification process ends.

(3-5) Future Position and Position Error Estimation Process

FIG. 16 illustrates a flow of specific processes of the future position and position error estimation process performed by the future position and position error estimation unit 33 (see FIG. 2) in step SP3 of FIG. 9. FIG. 16 illustrates a flow of the future position and position error estimation process for one individual user. The same future position and position error estimation process is performed in sequence or in parallel for each user.

The future position and position error estimation process starts when the future position and position error estimation unit 33 is activated by the time-series positional data frequency analysis unit 30. The user position prediction unit 46 (see FIG. 2) first acquires positional data for N periods immediately near the target user from the user positional information table 22 (see FIG. 3) (SP40). One period is a cycle in which the mobile terminal 2 acquires the positional data and is 5 minutes, as described above, in the case of the embodiment. In the case of the embodiment, "N" is a period length set as a period learning data used for the prediction. For example, in the case of the example of FIG. 17, N is a total number of pieces of data at intervals of 5 minutes for 1 year and N=365×24×60/5=105120.

Subsequently, on the basis of the acquired position data, the user position prediction unit 46 sequentially predicts the positions of the target user in sequence after one period passes for a current time (SP41).

Specifically, the user position prediction unit 46 generates an auto regression (AR) model given by the following expression on the basis of the positional data for N periods of the target user acquired from the user positional information table 22.

$$y_t = c + \sum_{i=1}^{P} \phi_i y_{t-i} + \varepsilon_t \qquad (5)$$

In Expression (5), $y_t$ indicates a predicted position of the target user at time t, c indicates a constant, P indicates a degree of the model, $\phi_i$ ($\phi_1, \ldots, \phi_P$) indicates a parameter of a model, and $\varepsilon_t$ indicates an error. In Expression (5), an optimum value can be calculated as a value of the degree P using Akaike's information criterion (AIC) as an index. Each optimum value can be calculated as a value of each parameter $\phi_i$ ($\phi_1, \ldots, \phi_P$) for each set using, for example, a Yule Walker method.

Then, the user position prediction unit 46 calculates a future position of the target user after one period passes from the current time, as illustrated in FIG. 17, using the auto regression model of Expression (5) and the positional data for N periods of the target user read from the user positional information table. The user position prediction unit 46 calculates the future position of the user after one period further passes from the future position of the target user calculated finally using the auto regression model of Expression (5), by using the positional data for N periods chronologically old from the future position using the calculated future position of the target user as a beginning. The user position prediction unit 46 repeats the calculation to sequentially calculate the future position of the target user after each period passes from the current time.

How many period ahead the future positions are to be predicted is determined in accordance with, for example, an interval at which the information distribution is performed. For example, an information distribution interval input in advance from the input and output device 18 is set as a period length in which the prediction of the future position is performed. Normally, when the information distribution is performed on the basis of the current position of the user, delay occurs in the information distribution to the user due to acquisition of the user positional information and communication delay of the distribution. By performing the prediction of the future position ahead by the information distribution interval, it is possible to determine the information to be distributed at the time of subsequent information distribution in consideration of a site at which there is a high possibility of the user being located at that time. Therefore, it is possible to suppress the delay of the information distribution to the user. In particular, when the current time is used as a future time, prediction of a current site can be performed. In the prediction of the current site, by performing the position prediction earlier by one period, it is possible to suppress an error from the current position of an actual user due to communication delay of information acquisition and suppress an error from an actual current position of the user at the time of occurrence of an abrupt positioning error of GPS positioning.

Then, the user position prediction unit 46 stores the future position of the target user for a given period calculated in this way in the user position prediction information table 24 (see FIG. 7) in association with a future date and time (time stamp) corresponding to the future position (SP42). The user position prediction unit 46 subsequently calls the position error range estimation unit 47 (see FIG. 2).

When the position error range estimation unit 47 is called by the user position prediction unit 46, the position error range estimation unit 47 estimates each error range of the future position for each period of the target user predicted by the user position prediction unit 46, as described above (SP43).

A variation in the future position can also be estimated on the basis of a dispersion of the values of the time-series positional data for each previous period of the target user. For example, a conditional volatility (data change ratio) can be calculated using a dispersion auto regression model such as a generalized auto regressive conditional heteroscedasticity (GARCH) model as an auto regression model and an error of each future position can be estimated. An error range (existence area) of the predicted site can be calculated from the error.

Then, the position error range estimation unit 47 stores the error range of the future position of the user for each period estimated in this way in the user position prediction information table 24 in association with a corresponding future time (SP44).

The future position and position error estimation process performed by the future position and position error estimation unit 33 through the foregoing processes ends. The position error range estimation unit 47 subsequently notifies the information distribution event determination and execution unit 21 (see FIG. 2) that the future position and position error estimation process ends.

(3-6) Information Distribution Event Determination and Execution Process

FIG. 18 illustrates a flow of specific processes of the information distribution event determination and execution process performed by the information distribution event determination and execution unit 21 in step SP5 of FIG. 9. FIG. 18 illustrates a flow of the information distribution event determination and execution process for one individual user. The same information distribution event determination and execution process is performed in sequence or in parallel for each user.

The information distribution event determination and execution process starts when the information distribution event determination and execution unit 21 receives both notification transmitted from the cluster center-of-gravity locus generation unit 45 of the behavior pattern classification unit 32 and indicating end of the above-described behavior pattern classification process and notification transmitted from the position error range estimation unit 47 of the future position and position error estimation unit 33 and indicating end of the above-described future position and position error estimation process. Then, the information distribution event determination unit 48 first acquires the day attribute of today from the day attribute information table 23Z (see FIG. 6) (SP50).

Subsequently, when the information is distributed to the user at a given time interval, the information distribution event determination unit 48 acquires the predicted position (future position) of the target user after a predefined distribution period time (referred to as an X time) passes. When the information is distributed to the user at a predefined time (which is a single time or a plurality of times and is referred to a distribution scheduled time), the information distribution event determination unit 48 acquires the predicted position (future position) of the target user at the distribution scheduled time immediately near the current time from the user positional prediction information table 24 (SP51).

Subsequently, the information distribution event determination unit 48 determines the type of information of a distribution candidate (hereinafter this is referred to as distribution candidate information type) for the target user with reference to the feature site estimation result table 23X (see FIG. 4) and the distribution candidate information table 25 (see FIG. 8) on the basis of the attribute (a work day or a day-off) of today of the target user acquired in step SP50 and the predicted position of the target user acquired in step SP51 (SP52). Specifically, whether the user is located at a predetermined feature site is determined through a process using position coordinates of each site ID in the feature site estimation result table 23X (see FIG. 4), current or future position coordinates acquired in step SP51, an estimation error acquired in step SP51, and a preset allowable error of each site. In an embodiment, a circle that has an estimation error as a radius centering on current or future position coordinates and a circle that has an allowable error of a site as a radius centering on position coordinates of the site ID of the site are calculated. It is determined that the calculated two circles overlap each other. When the circles overlap each other, the site is determined to be an existence site of a user. The determination process is repeated at the sites of all the sites ID to determine the existence site of the user. As the allowable error of each site, a value for a predetermined site is input from the input and output device 18. In GPS positioning, an error from an actual position of a mobile terminal occurs due to radio wave interference caused due to various obstacles near the mobile terminal. Through the process, whether there is each site of the user can be determined while allowing a different GPS positioning error for each site. As another determination method, a process may be simplified to improve a processing speed, for example, by comparing values obtained by rounding off predetermined decimal points of current or future position coordinates and the latitude and longitude of the position coordinates of each site ID and determining whether the values match to determine whether there is a site.

For example, the information distribution event determination unit 48 determines a type of distribution candidate information as "lunch information near a workplace with reference to the distribution candidate information table 25 when a day attribute of today of the target user acquired in step SP50 is a "work day", a predicted position of the target user at a predefined latest distribution time or a time after the X time acquired in step SP51 is a "work place", and the predefined latest distribution time or the time after the X time is "11:00".

The information distribution event determination unit 48 subsequently waits until the X time passes or when the predefined latest distribution scheduled time comes (SP53). Then, the information distribution event determination unit 48 calls the information distribution event execution unit 49 when the X time soon passes or when the latest distribution scheduled time comes.

When the information distribution event execution unit 49 is called by the information distribution event determination unit 48, the information distribution event execution unit 49 acquires distribution information matching the type of distribution candidate information determined by the information distribution event determination unit 48 from the distribution information database 26 and distributes the acquired distribution information to the target user (SP54).

As described, the distribution of one time for one individual user ends. Then, in the information distribution event determination and execution unit 21, the process returns to step SP50. Thereafter, the processes of steps SP50 to SP54 are repeated as necessary.

(4) Advantageous Effects of Embodiment

In the information distribution system 1 described above according to the embodiment, a regular behavior of a user is estimated for each user on the basis of the previous positional information (the time-series positional data) of the user and planning of the information distribution for the user is performed on the basis of the estimation result. Accordingly, in the information distribution system 1, the planning of the information distribution tailored for a regular behavior of a user can be performed for each user. Therefore, it is possible to efficiently distribute the information suitable for the user to each user. In the planning, it is possible to realize the information distribution system for which the high information distribution advantageous effect can be expected.

In the information distribution system 1, a periodic behavior is estimated as a regular behavior of the user. Therefore, it is possible to distribute appropriate information tailored for the periodic behavior to an office worker who periodically behaves particularly at a daily cycle and a weekly cycle.

Further, in the information distribution system 1, the auto regression model is generated on the basis of the recent time-series positional data of the user and a future position of the user is predicted. Therefore, the future position of the user can be predicted to a certain degree of precision even for a behavior deviating from a regular behavior, and thus the appropriate information according to the current position of the user can be distributed to the user.

(5) Other Embodiments

In the above-described embodiment, the case has been described in which a mobile communication body is a portable communication terminal such as the mobile terminal 2, but the present invention is not limited thereto. For example, the present invention can be applied even to a case of a mobile communication body such as a car navigation system other than a portable communication terminal device.

Further, in the above-described embodiment, the case has been described in which the positioning device 14 is mounted on a mobile communication body and the position of the mobile communication body is acquired by the positioning device 14, but the present invention is not limited thereto. For example, the position of each mobile communication body may be detected by any means such as a sensor other than the positioning device 14. The position of each mobile communication body may be positioned by an external device such as an external surveillance camera without mounting a function of positioning the position of the mobile communication body on the mobile communication body and a result (positional information of each mobile communication body) may be collected by the information distribution device 3.

Further, in the above-described embodiment, the case has been described in which the Fourier transform is applied as a conversion method of converting each piece of time-series positional data into the frequency data of the frequency domain at the time of the clustering execution process, but the present invention is not limited thereto. For example, a conversion method such as wavelet transform other than the Fourier transform can be broadly applied.

Further, in the above-described embodiment, the case has been described in which the positional information (including the time-series positional data) collected from each mobile terminal 2 by the information distribution device 3 composes of only two coordinate values of latitude and longitude, but the present invention is not limited thereto. For example, when the positional information (including the time-series positional data) includes data values related to a plurality of coordinate axes such as the latitude, the longitude, and the height, the time-series positional data may be converted into complex data so that the data value is allocated to one of the real part and the imaginary part.

Further, in the above-described embodiment, the case has been described in which the future position of the user is predicted and the information is distributed to the user on the basis of the prediction result, but the present invention is not limited thereto. For example, the present invention can also be applied to a system that predicts a future position of a taxi according to the same method as that of the above-described embodiment and controls a position or the like of the taxi on the basis of the prediction result. According to the present invention, the time-series positional data composed of the time-series positional information of the mobile communication body can be collected, a regular behavior of a user carrying the mobile communication body can be estimated on the basis of the collected time-series positional data of the mobile communication body, and planning of optimum information distribution for the user or planning for controlling the user to an optimum state can be performed.

INDUSTRIAL APPLICABILITY

The present invention can broadly be applied to an information distribution device that distributes information to a mobile communication body on which a positioning function of acquiring positional data of a current position of the mobile communication body is mounted.

REFERENCE SIGNS LIST

1 . . . information distribution system
2 . . . mobile terminal
3 . . . information distribution device
10, 15 . . . CPU
11, 16 . . . memory device
20 . . . regular behavior estimation unit 21 . . . information distribution event determination and execution unit
22 . . . user positional information table
23 . . . user attribute information database
23X . . . feature site estimation result table
23Y . . . day classification information table
23Z . . . day attribute information table
24 . . . user position prediction information table
25 . . . distribution candidate information table
26 . . . distribution information database
30 . . . time-series positional data frequency analysis unit
31 . . . periodic behavior estimation unit
32 . . . behavior pattern classification unit
33 . . . future position and position error estimation unit
40 . . . positional information acquisition unit
41 . . . feature amount generation unit
42 . . . visit periodicity calculation unit
43 . . . feature site estimation unit
44 . . . clustering execution unit
45 . . . cluster center-of-gravity locus generation unit
46 . . . user position prediction unit
47 . . . position error range estimation unit
48 . . . information distribution event determination unit
49 . . . information distribution event execution unit
50 . . . day attribute calendar The invention claimed:

1. An information processing device connected over a network to a mobile terminal carried by a user, the information processing device comprising:
   an interface configured to communicate with the mobile terminal via the network;
   a memory configured to store instructions; and
   a processor that is programmed by the instructions in the memory to execute:
   collecting time-series positional data composed of time-series positional information of the mobile terminal and estimating a regular behavior of the user of the mobile terminal on the basis of the time-series positional data of the mobile terminal; and
   determining information to be distributed to the user and distributing the determined information to the mobile terminal of the user,
   converting the time-series positional data of the mobile terminal into frequency data of a frequency domain and generating a plurality of feature amounts of the frequency data,
   detecting a periodic behavior of the user on the basis of the plurality of feature amounts of the frequency data, extracting a plurality of feature sites to which the user periodically visits on the basis of the detected periodic behavior, and estimating respective attributes of each of the extracted feature sites, and
   classifying the daily time-series positional data of the user into a plurality of clusters on the basis of the feature amount of the frequency data, generating a respective movement pattern for each of the classified clusters, classifying a plurality of behavior patterns of the user on the basis of the movement pattern for each of the classified clusters the estimated attribute of each of the feature sites,
   wherein the determined information to be distributed to the mobile terminal of the user is based on a classification result of the behavior patterns and an estimation result of the respective attributes of each of the extracted feature sites.

2. The information processing device according to claim 1,
   wherein the processor is further programmed to execute:
   predicting a future position of the user on the basis of the time-series positional data,
   wherein the determined information to be distributed to the mobile terminal of the user is based on the classification result of the behavior patterns, the estimation result of the respective attributes of each of the extracted feature sites, and the predicted future position of the user.

3. The information processing device according to claim 2,
   wherein the processor is further programmed to execute:
   generating an auto regression model of the user on the basis of the time-series positional data, and
   predicting the future position of the user on the basis of the generated auto regression model.

4. The information processing device according to claim 2,
   wherein the processor is further programmed to execute:
   estimating a variance of the predicted future position of the user on the basis of a dispersion of the time-series positional data of the user and calculates an error range of a predicted site.

5. The information processing device according to claim 4,
   wherein the processor is further programmed to execute:
   determining one of the feature sites in which the user is located on the basis of the predicted future position of the user, the attributes of each of the feature sites, the error range of the predicted site, and an allowable error of each of feature sites.

6. An information processing method to distribute information to a mobile terminal, comprising:
   collecting time-series positional data composed of time-series positional information of the mobile terminal;
   converting the time-series positional data of the mobile terminal into frequency data of a frequency domain and generating a plurality of feature amounts of the frequency data;
   detecting a periodic behavior of the user on the basis of the plurality of feature amounts of the frequency data, extracting a plurality of feature sites to which the user periodically visits on the basis of the detected periodic behavior, and estimating respective attributes of each of the extracted feature sites;
   classifying the daily time-series positional data of the user into a plurality of clusters on the basis of the feature amount of the frequency data, generating a respective movement pattern for each of the classified clusters, classifying a plurality of behavior patterns of the user on the basis of the movement pattern for each of the classified clusters the estimated attribute of each of the feature sites;
   determining information to be distributed to the mobile terminal of the user on the basis of a classification result of the behavior patterns and an estimation result of the respective attributes of each of the features sites; and
   distributing the determined information to the mobile terminal of the user.

7. The information processing method according to claim 6, further comprising:
   predicting a future position of the user on the basis of the time-series positional data; and
   determining the information to be distributed to the mobile terminal of the user on the basis of the classification result of the behavior patterns, the estimation result of the respective attributes of each of the extracted feature sites, and the predicted future position of the user.

8. The information processing method according to claim 7, further comprising:
generating an auto regression model of the user on the basis of the time-series positional data; and
predicting the future position of the user on the basis of the generated auto regression model.

9. The information processing device according to claim 7, further comprising:
estimating a variance of the predicted future position of the user on the basis of a dispersion of the time-series positional data of the user; and
calculating an error range of a predicted site.

10. The information processing method according to claim 9, further comprising:
determining one of the feature sites in which the user is located on the basis of the predicted future position of the user, the attributes of each of the feature sites, the error range of the predicted site, and an allowable error of each of feature sites.

* * * * *